United States Patent
Yakoel et al.

(10) Patent No.: US 9,038,175 B1
(45) Date of Patent: May 19, 2015

(54) PROVIDING AN AUTOMATIC ELECTRONIC FRAUD NETWORK DATA QUALITY FEEDBACK LOOP

(71) Applicant: EMC Corporation, Hopkinton, MA (US)

(72) Inventors: Erez Yakoel, Kidron (IL); Lior Asher, Tel Aviv (IL); Ido Zilberberg, Netanya (IL)

(73) Assignee: EMC Corporation, Hopkinton, MA (US)

( * ) Notice: Subject to any disclaimer, the term of this patent is extended or adjusted under 35 U.S.C. 154(b) by 108 days.

(21) Appl. No.: 13/919,346

(22) Filed: Jun. 17, 2013

(51) Int. Cl.
*H04L 29/06* (2006.01)
*G06F 21/57* (2013.01)

(52) U.S. Cl.
CPC .......... *H04L 63/1408* (2013.01); *G06F 21/577* (2013.01)

(58) Field of Classification Search
CPC ..................................................... G06F 21/577
USPC ............................................................ 726/22
See application file for complete search history.

(56) References Cited

U.S. PATENT DOCUMENTS

2012/0101930 A1* 4/2012 Li et al. ........................... 705/35

* cited by examiner

*Primary Examiner* — Jacob Lipman
(74) *Attorney, Agent, or Firm* — Ryan, Mason & Lewis, LLP

(57) ABSTRACT

Methods, apparatus and articles of manufacture for providing an automatic electronic fraud network data quality feedback loop are provided herein. A method includes evaluating an item of input data provided by a given source, wherein the item of input data comprises a fraud-related status identifier provided by the given source, and wherein said evaluating comprises determining a level of accuracy associated with the fraud-related status identifier; outputting the determined level of accuracy associated with the fraud-related status identifier to the given source; and updating a trust measure associated with the given source based on the determined level of accuracy associated with the fraud-related status identifier provided by the given source.

19 Claims, 4 Drawing Sheets

---

EVALUATE AN ITEM OF INPUT DATA PROVIDED BY A GIVEN SOURCE, WHEREIN THE ITEM OF INPUT DATA COMPRISES A FRAUD-RELATED STATUS IDENTIFIER PROVIDED BY THE GIVEN SOURCE, AND WHEREIN SAID EVALUATING COMPRISES DETERMINING A LEVEL OF ACCURACY ASSOCIATED WITH THE FRAUD-RELATED STATUS IDENTIFIER — 402

OUTPUT THE DETERMINED LEVEL OF ACCURACY ASSOCIATED WITH THE FRAUD-RELATED STATUS IDENTIFIER TO THE GIVEN SOURCE — 404

UPDATE A TRUST MEASURE ASSOCIATED WITH THE GIVEN SOURCE BASED ON THE DETERMINED LEVEL OF ACCURACY ASSOCIATED WITH THE FRAUD-RELATED STATUS IDENTIFIER PROVIDED BY THE GIVEN SOURCE — 406

PROVIDING AN AUTOMATIC ELECTRONIC FRAUD NETWORK DATA QUALITY FEEDBACK LOOP

FIELD

The field relates generally to information technology (IT), and more particularly to fraud detection.

BACKGROUND

An electronic fraud network (EFN) acts as a data hub obtaining and/or capturing fraud-related or potentially fraud-related information from multiple products and installations. Once obtained and/or captured, the EFN analyzes the data, sanitizes portions of the data as necessary, and creates a unified feed for subsequent use by all installations. By way merely of example, fraud-related information might include a list of interne protocol (IP) addresses (or other identifiers) used to generate and/or further fraud-related activities. Additionally, fraud-related information can include a list of genuine IP addresses not associated with fraud-related activities. The EFN can obtain such lists from multiple providers such as various product installations and/or entities (also referred to herein as customers).

Using such information, the EFN can generate one unified list identifying each list entry as likely fraud-related or likely not fraud-related. The EFN may also, for example, incorporate a weight and/or risk measure per IP address associating a probability measure to each entry's identified status. In generating the unified list, the EFN commonly takes into account variables such as repetitions between sources (indicating a higher level of assurance) and conflicts between sources (indicating a lower level of assurance).

However, existing approaches utilizing such techniques face challenges. For example, customers may repeatedly provide low-quality or inaccurate data. Such data may include an improper format, erroneous classifications of data (for example, genuine/non-fraudulent data marked as fraud-related data), etc. Accordingly, a need exists for the capability to automatically provide feedback to customers regarding the quality of information provided to an EFN so that the customers may provide higher quality data in the future.

SUMMARY

One or more illustrative embodiments of the present invention provide techniques for implementing an automatic electronic fraud network (EFN) data quality feedback loop.

In accordance with an aspect of the invention, a method is provided comprising the steps of: evaluating an item of input data provided by a given source, wherein the item of input data comprises a fraud-related status identifier provided by the given source, and wherein said evaluating comprises determining a level of accuracy associated with the fraud-related status identifier; outputting the determined level of accuracy associated with the fraud-related status identifier to the given source; and updating a trust measure associated with the given source based on the determined level of accuracy associated with the fraud-related status identifier provided by the given source.

Another aspect of the invention includes a method comprising the steps of: analyzing a set of one or more items of input data provided by a given source based on one or more fraud assessment parameters, wherein each of said one or more items of input data comprises a fraud-related status identified by the given source; computing a fraud probability measure for each of the one or more items of input data based on (i) said analyzing and (ii) a trust measure associated with the given source; generating an evaluation of the set of one or more items of input data provided by the given source, wherein said evaluation comprises one or more items of information pertaining to a comparison of the computed fraud probability measure for each of the one or more items of input data and the fraud-related status identified by the given source of each of the one or more items of input data; and updating the trust measure associated with the given source based on the evaluation generated for the set of one or more items of input data provided by the given source.

The automatic data quality feedback techniques of the illustrative embodiments overcome one or more of the problems associated with the conventional techniques described previously, and provide an automated means by which to improve data quality associated with an EFN. These and other features and advantages of the present invention will become more readily apparent from the accompanying drawings and the following detailed description.

DETAILED DESCRIPTION

As will be described, the present invention, in one or more illustrative embodiments, provides techniques for implementing an automatic EFN data quality feedback loop. Such techniques will facilitate entities utilizing the EFN (also referred to herein as customers) to improve the quality of data provided to the EFN. By way of further illustration, entities (customers) utilizing an EFN can include, for example, financial institutions as well as other companies and business, and such entities have end-users (for example, individuals) using the entity's system.

Illustrative embodiments of the present invention will be described herein with reference to exemplary communication systems and associated processing devices. It is to be appreciated, however, that the invention is not restricted to use with the particular illustrative system and device configurations shown. Accordingly, a communication system or computing device, as used herein, is intended to be broadly construed so as to encompass any type of system in which multiple processing devices can communicate with one or more other devices.

Figure 1:
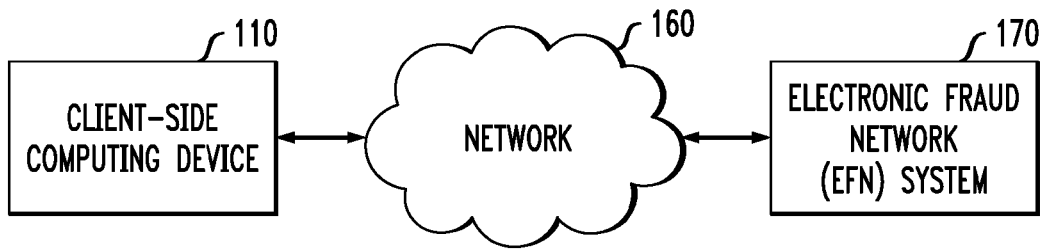
FIG. 1 is a diagram illustrating an example network environment in which one or more embodiments of the present invention can operate.

FIG. 1 illustrates an example client-side computing device (CSCD) 110 communicating with an electronic fraud network (EFN) system 170 over a network 160. The network 160 can include, for example, a global computer network such as the Internet, a wide area network (WAN), a local area network (LAN), a satellite network, a telephone or cable network, or various portions or combinations of these and other types of networks.

In at least one embodiment of the invention, the CSCD 110 is a customer server which updates the EFN system 170 (or, for example, an EFN agent) with data. Such an embodiment can be implemented within the context of a business-to-business (B2B) application. Also, the CSCD 110 may represent a portable device, such as a mobile telephone, personal digital assistant (PDA), wireless email device, etc. The CSCD 110 may alternatively represent a desktop or laptop personal computer (PC), a microcomputer, a workstation, a mainframe computer, or any other information processing device which can benefit from the use of automatic EFN data quality feedback techniques in accordance with the invention. It is to be appreciated that a given embodiment of the disclosed system may include multiple instances of CSCD 110 and possibly other system components, although only a single instance is shown in the simplified system diagram of FIG. 1 for clarity of illustration.

The CSCD 110 may also be referred to herein as simply a "customer." The term "customer," as used in this context, should be understood to encompass, by way of example and without limitation, a customer device, a person or entity utilizing or otherwise associated with the device, or a combination of both. An operation described herein as being performed by a customer may therefore, for example, be performed by a customer device, a person or entity utilizing or otherwise associated with the device, or by a combination of both the person and the device. Similarly, information described as being associated with a customer may, for example, be associated with a CSCD device 110, a person or entity utilizing or otherwise associated with the device, or a combination of both the person and the device.

An exemplary EFN system (such as system 170 in FIG. 1) is described in additional detail below in connection with FIG. 2.

Figure 2:
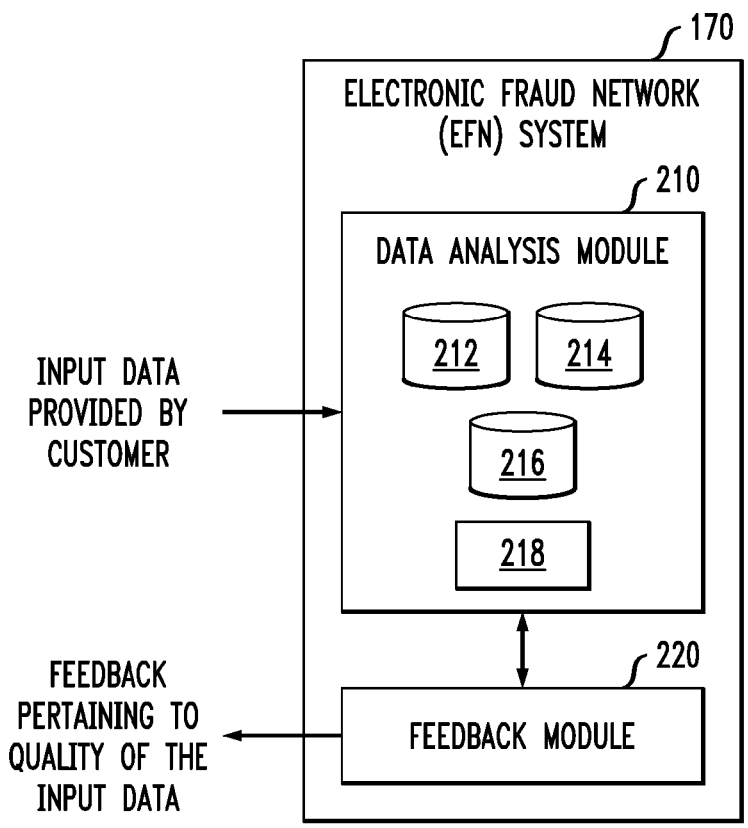
FIG. 2 is a block diagram illustrating example system components, according to an embodiment of the invention.

Accordingly, FIG. 2 is a block diagram illustrating example system components, according to an embodiment of the invention. By way of illustration, FIG. 2 depicts EFN system 170, as noted above, which receives input data provided by a customer and outputs feedback pertaining to the quality of the input data. Additionally, EFN system 170 includes a data analysis module 210 and a feedback module 220. As described further herein, the data analysis module 210 can include, for example, an input format database 212 and a customer database 214 containing historical data and/or trust information associated with the specific customer providing the input data.

The data analysis module 210 can also include a system database 216 containing historical data and/or information pertaining to one or more additional customers, and a fraud probability calculator module 218. In at least one embodiment of the invention, the system database 216 includes IP addresses, payee account numbers, end-user device fingerprints (such as for desktops/laptops), end-user cookies and flash cookies, hardware identifiers (IDs) and media access control (MAC) addresses of end-user mobile devices.

As detailed herein, the EFN system 170 makes multiple determinations regarding input data and the source(s) of such input data. For example, as depicted in FIG. 2, the data analysis module 210 can leverage historical data and/or trust information from customer database 214 to determine a probability associated with the quality and/or accuracy of input data provided by a given source or customer. In making such a determination, the data analysis module 210 examines historical data and/or trust information from customer databases (such as database 214) in search of repetitions between sources (leading to a higher assurance level) and conflicts between sources (leading to a lower assurance level). For example, if one IP address was recently marked as fraudulent by multiple sources, the assurance will be deemed high that the given IP address is indeed fraudulent. In contrast, if an IP address was marked as fraudulent by sources and marked as genuine by other sources, the assurance will be deemed low that the given IP address is either fraudulent or genuine. Such determinations can additionally include incorporating the level of trust associated with one or more specific sources.

For example, at least one embodiment of the invention includes manually assigning initial trust values to various sources based on historical information pertaining to accuracy levels associated with one or more customers. These values can change over time in accordance with an aspect of the invention. With respect to historical data, data provided by EFN customers (for example, IP addresses and their fraud marking) can be retained for a period of time, for example, from the last X days, in order to base a feedback calculation thereon. The noted period of time is configurable, and can be, for instance, based on a decision by information security analysts.

Additionally, the data analysis module 210 compares the format of the input data provided by the customer to input format database 212, and also analyzes the content and format of the input data provided by the customer to system database 216 to determine validity. Accordingly, in analyzing the format of input data, the data analysis module 210 examines the data to ensure that the format of such data is valid (for example, that an internet protocol version 4 (IPv4) entry has four fields of values between 0 and 255).

Further, the results of the analyses and/or comparisons carried out by the data analysis module 210 in connection with input format database 212, customer database 214 and system database 216 are provided to the fraud probability calculator module 218 to compute a probability level and/or probability range indicating that the given input data is likely fraudulent or likely not fraudulent.

The calculated probability level, along with supplemental information pertaining to contextual details associated with this calculated probability level, is provided to the feedback module 220 for feedback generation and output. By way of example, supplemental information can include a specification of the data elements in the input data suspected of being incorrect, inaccurate, or of low quality. Supplemental information can additionally include, for example, a description of why such data elements are suspected of being incorrect, inaccurate, etc. (for example, improper format, contradiction with other customer input data). Further, the supplemental information can also include a measure or value indicating a level of certainty with the assessment that particular data elements are suspected of being incorrect, inaccurate, etc. Such a certainty level can be, for example, based on determinations of repetitions between sources and/or entries (leading to a higher certainty level) and conflicts between sources and/or entries (leading to a lower certainty level).

In at least one embodiment of the invention, the feedback generated and output via feedback module 220 can be composed in one of multiple formats. The format can be, for example, selected by the given customer. For example, the feedback can include an offline file containing a list of data elements sent by the customer, with EFN feedback added to each data element in the list. Such EFN feedback might include status identifiers such as, for example, "Fair,"

"Good," "Excellent," and "Poor," or the feedback might include brief problem identifiers such as, "improper format," etc. Such feedback, in accordance with at least one embodiment of the invention, can be configurable by the customer.

At least one embodiments of the invention also include updating customer-specific trust information, such as maintained in customer database 214, based on the feedback generated for input data provided by a given customer. Such customer-specific information can, for example, be based on the number of accurate/high quality records provided by the customer and the number of inaccurate/low quality records provided by the customer.

Additionally, such updating can continue iteratively over time. For example, trust levels and/or measures in customer database 214 increase for the given customer upon receipt of favorable or positive feedback pertaining to associated input data, and trust levels and/or measures in customer database 214 decrease upon receipt of unfavorable or negative feedback pertaining to associated input data (indicating that such data contained errors and/or inaccuracies).

Also, at least one embodiment of the invention includes weighting input data in a multi-source or multi-customer context. By way of example, input data being provided by a customer having a higher trust measure will be weighted higher than input data being provided by a customer having a lower trust measure. Such weighting would affect (as one of multiple variables) the ultimate probability measure computed by the fraud probability calculator module 218.

Figure 3:
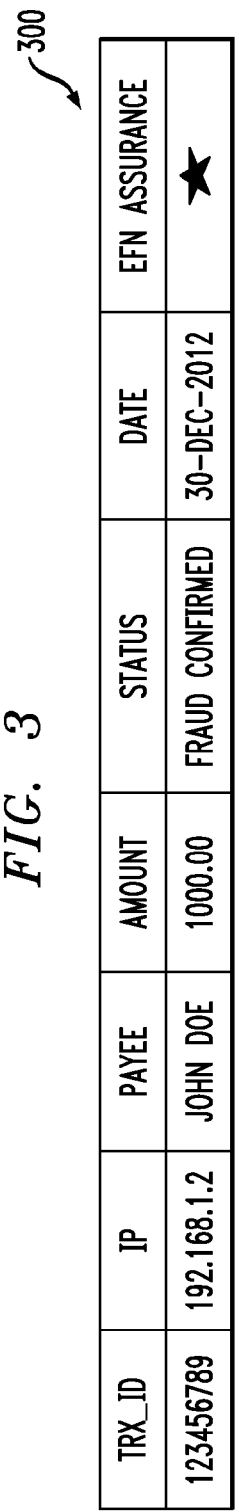
FIG. 3 is a diagram illustrating an example case management feedback entry, according to an embodiment of the invention.

FIG. 3 is a diagram illustrating an example case management feedback entry 300, according to an embodiment of the invention. By way merely of example, such a feedback entry 300 can include information such as a data and/or customer identifier (TRX_ID), an associated IP address, a status of the data in question (that is, pertaining to its identification as fraud-related or not fraud-related), a date of entry and an EFN system assurance annotation. Further, transaction-specific information pertaining to the given input data can be included in the feedback entry 300 as well. Such information can include, for example, payee name or identifier and payment amount for a payment-related transaction.

As noted above and depicted in example entry 300 in FIG. 3, at least one embodiment of the invention can include providing visual feedback to a customer's decision to mark a transaction as likely fraudulent or likely not fraudulent in the customer's original input data. For instance, in example entry 300, the transaction in question has been marked with a star (and it should be noted that other visual identifiers other than a star can be used) under "EFN Assurance" to confirm that the original customer assessment of the data element was reinforced by additional sources (such as detailed above in connection with FIG. 2).

It is noted that FIG. 3 is merely one example entry, used herein for purposes of illustration. Additional entries can also be implemented by one or more embodiments of the invention. By way of example, a feedback entry may include an aggregate that indicates, for instance: "Of the IP addresses which you marked as 'Confirmed Fraud' on the date 14 Jun. 2013, 35% were correlated by EFN's additional data sources as fraudulent." Additionally, another example feedback entry may include a list of specific data values such as: "IP Address 127.0.0.1, which you marked as 'Confirmed Fraud,' was correlated with two additional sources." Such feedback entries can be used by information security personnel on the customer side. An example entry such as depicted in FIG. 3 can also be used to visually confirm correct fraud marking for the customer's case management operators (that is, the entities that initially mark a transaction as fraudulent or genuine).

Figure 4:
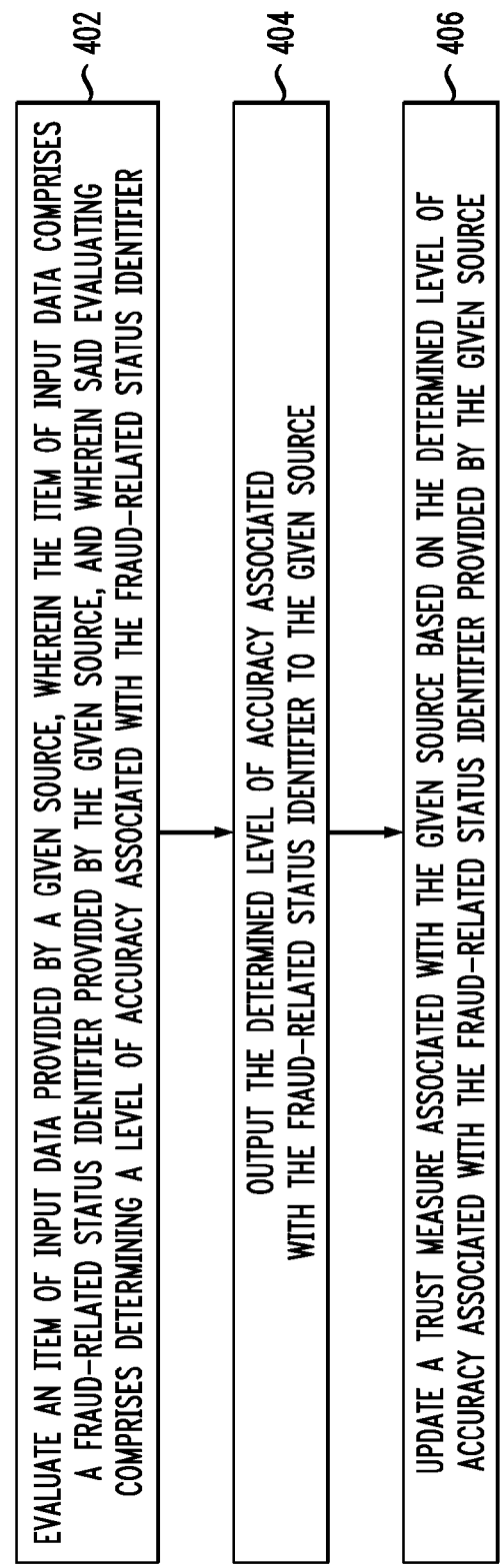
FIG. 4 is a flow diagram illustrating techniques according to an embodiment of the invention.

FIG. 4 is a flow diagram illustrating techniques according to an embodiment of the present invention. Step 402 includes evaluating an item of input data provided by a given source, wherein the item of input data comprises a fraud-related status identifier provided by the given source, and wherein said evaluating comprises determining a level of accuracy associated with the fraud-related status identifier.

As described herein, evaluating can include comparing the item of input data provided by the given source to one or more established formatting standards associated with input data. Established formatting standards associated with input data can be derived, for example, from formatting standards within an electronic fraud network. Additionally, evaluating can include comparing the item of input data provided by the given source to one or more items of input data provided by one or more additional sources, as well as comparing the item of input data to additional items of input data previously provided by the given source. Further, as detailed herein, evaluating can include weighting the item of input data based on the trust measure associated with the given source.

Step 404 includes outputting the determined level of accuracy associated with the fraud-related status identifier to the given source. In accordance with at least one embodiment of the invention, the determined level of accuracy associated with the fraud-related status identifier can be output to the given source in one or more formats. Outputting the determined level of accuracy can also include providing a description of one or more aspects of the item of data responsible for the determined level of accuracy associated with the fraud-related status identifier. Also, the outputting step can additionally include providing a measure indicating a level of certainty associated with the determined level of accuracy associated with the fraud-related status identifier.

Outputting the determined level of accuracy can additionally include providing visual feedback to the given source in response to a decision by the given source to annotate the item of input data with the fraud-related status identifier. Such action can, for example, facilitate a customer to improve the customer's case management system. By way of example, providing visual feedback can include identifying an instance wherein the fraud-related status identifier is deemed accurate based on a comparison to one or more additional sources. For instance, an example embodiment of the invention can include symbolizing (via a star, for example) such transactions that the customers marked as fraudulent, and such decisions were subsequently reinforced by additional sources. Such an indication would represent to the customer that, for example, the customer assisted in track a serial fraudster. In the opposite case, a customer's case management system may choose to either show or not show transactions which have contradictory fraud/genuine marking, depending on customer requirements.

Step 406 includes updating a trust measure associated with the given source based on the determined level of accuracy associated with the fraud-related status identifier provided by the given source. As described herein, the trust measure associated with the given source can be maintained in an electronic fraud network database.

Figure 5:
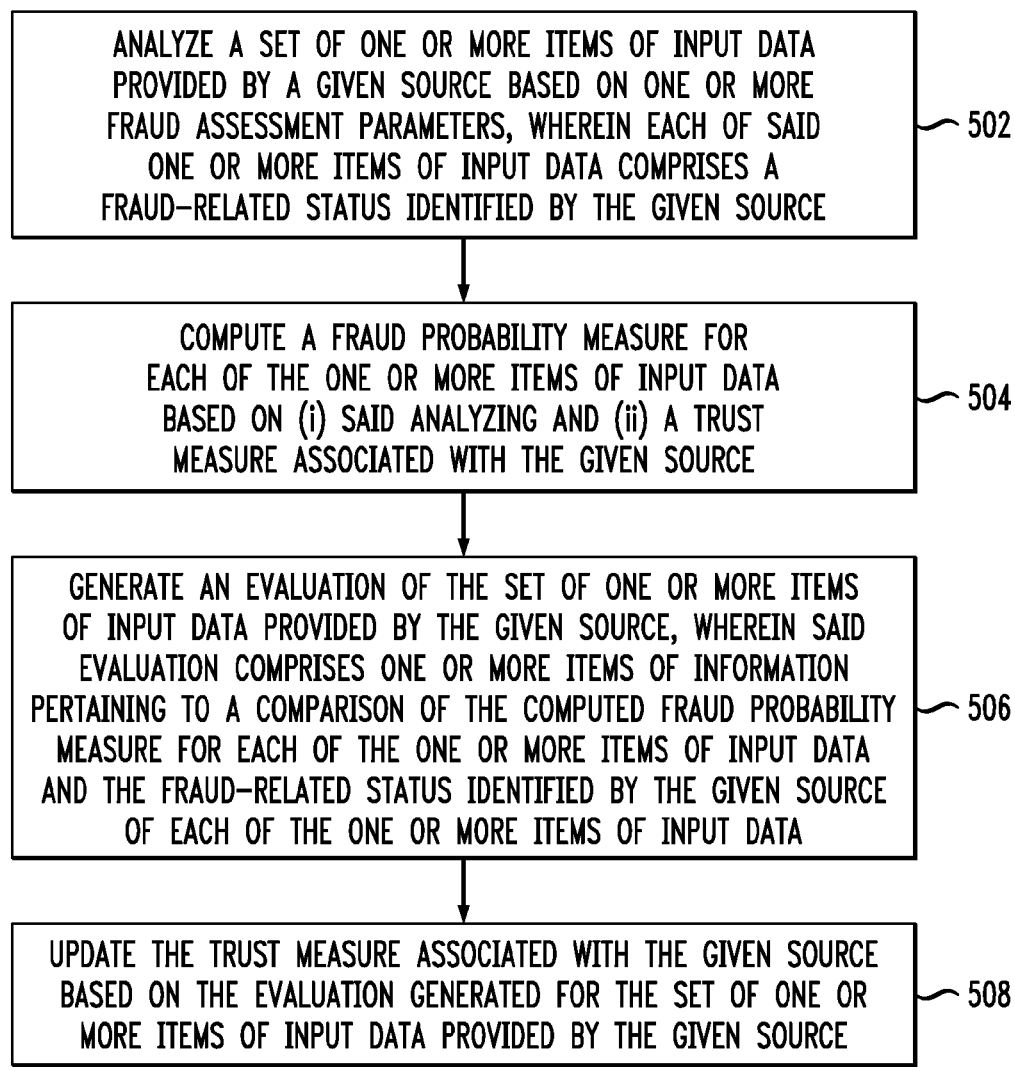
FIG. 5 is a flow diagram illustrating techniques according to an embodiment of the invention.

FIG. 5 is a flow diagram illustrating techniques according to an embodiment of the present invention. Step 502 includes analyzing a set of one or more items of input data provided by a given source based on one or more fraud assessment parameters, wherein each of said one or more items of input data comprises a fraud-related status identified by the given source. Step 504 includes computing a fraud probability measure for each of the one or more items of input data based on (i) said analyzing and (ii) a trust measure associated with the given source. As noted herein, the trust measure associated with the given source can be maintained in an electronic fraud network database.

Step 506 includes generating an evaluation of the set of one or more items of input data provided by the given source, wherein said evaluation comprises one or more items of information pertaining to a comparison of the computed fraud probability measure for each of the one or more items of input data and the fraud-related status identified by the given source of each of the one or more items of input data. Step 508 includes updating the trust measure associated with the given source based on the evaluation generated for the set of one or more items of input data provided by the given source.

The techniques depicted in FIG. 5 can additionally include repeating said updating step for each additional evaluation associated with each additional set of input data provided by the given source. Also, the techniques depicted in FIG. 5 can include outputting the evaluation to the given source. Outputting the evaluation can further include providing visual feedback to the given source in response to a decision by the given source to annotate each of the items of input data with the corresponding fraud-related status identifier.

Automated feedback techniques of the type described herein may be implemented in a wide variety of different applications. One additional exemplary communication system application that may incorporate such techniques will now be described with reference to FIG. 6.

Figure 6:
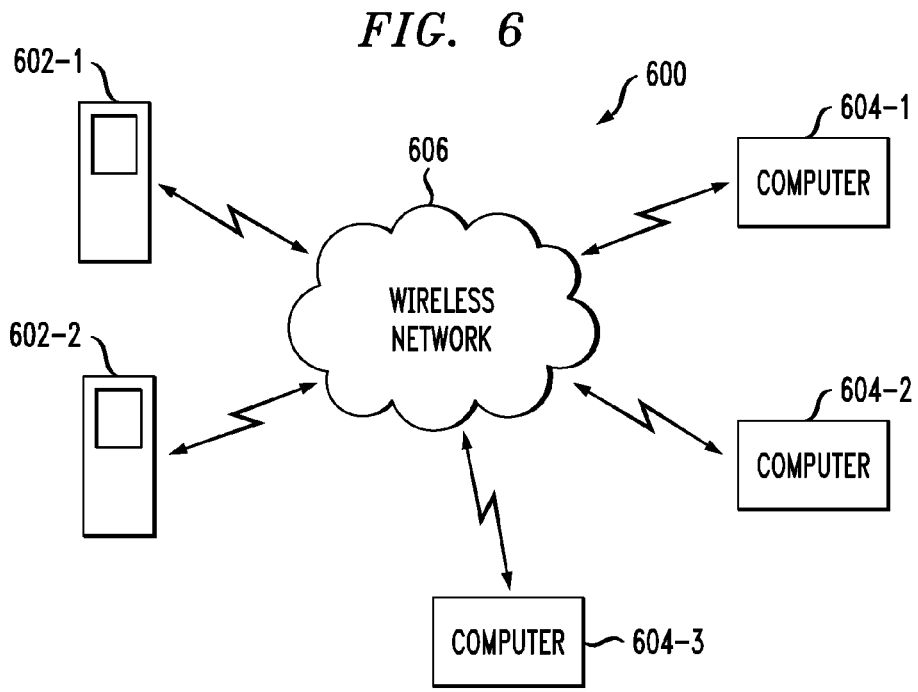
FIG. 6 shows an exemplary embodiment of a communication system that may incorporate the functionality of the type illustrated in at least one embodiment of the invention.

As depicted in FIG. 6, a communication system 600 comprises a plurality of mobile telephones 602-1 and 602-2 and computers 604-1, 604-2 and 604-3, configured to communicate with one another over a network 606. Any two or more of the devices 602 and 604 may correspond to cryptographic devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus (systems) and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each modules embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

Figure 7:
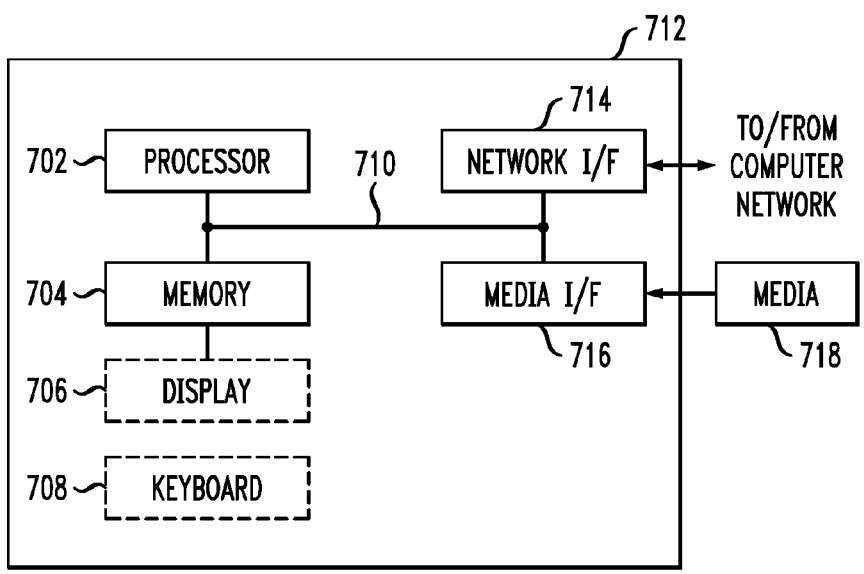
FIG. 7 is a system diagram of an exemplary computer system on which at least one embodiment of the invention can be implemented.

By way of example, an aspect of the present invention can make use of software running on a general purpose computer. As noted above, FIG. 7 is a system diagram of an exemplary computer system on which at least one embodiment of the invention can be implemented. As depicted in FIG. 7, an example implementation employs, for example, a processor 702, a memory 704, and an input/output interface formed, for example, by a display 706 and a keyboard 708. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 702, memory 704, and input/output interface such as display 706 and keyboard 708 can be interconnected, for example, via bus 710 as part of a data processing unit 712. Suitable interconnections via bus 710, can also be provided to a network interface 714 (such as a network card), which can be provided to interface with a computer network, and to a media interface 716 (such as a diskette or compact disc read-only memory (CD-ROM) drive), which can be provided to interface with media 718.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 708, displays 706, and pointing devices, can be coupled to the system either directly (such as via bus 710) or through intervening I/O controllers.

Network adapters such as network interface 714 (for example, a modem, a cable modem or an Ethernet card) can also be coupled to the system to enable the data processing system to become coupled to other data processing systems or remote printers or storage devices through intervening private or public networks.

As used herein, a server includes a physical data processing system (such as system 712 as depicted in FIG. 7) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a users computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and cryptographic devices that can benefit from an automated data quality feedback loop. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
    evaluating an item of input data provided by a given source, wherein the item of input data comprises a fraud-related status identifier attributed by the given source to an item of information, and wherein said evaluating comprises determining a level of accuracy associated with the fraud-related status identifier based on (i) a comparison of the item of input data provided by the given source to one or more items of input data provided by one or more additional sources, and (ii) a trust measure associated with the given source;

outputting the determined level of accuracy associated with the fraud-related status identifier to the given source; and updating the trust measure associated with the given source based on the determined level of accuracy associated with the fraud-related status identifier provided by the given source;

wherein at least one of said evaluating, said outputting, and said updating is carried out by a computing device.

2. The method of claim 1, wherein said evaluating further comprises comparing the item of input data provided by the given source to one or more additional items of input data previously provided by the given source.

3. The method of claim 1, wherein said evaluating further comprises weighting the item of input data based on the trust measure associated with the given source.

4. The method of claim 1, wherein said outputting further comprises providing a description of one or more aspects of the item of data responsible for the determined level of accuracy associated with the fraud-related status identifier.

5. The method of claim 1, wherein said outputting further comprises providing a measure indicating a level of certainty associated with the determined level of accuracy associated with the fraud-related status identifier.

6. The method of claim 1, wherein said outputting comprises outputting the determined level of accuracy associated with the fraud-related status identifier to the given source in one or more formats.

7. The method of claim 1, wherein said trust measure associated with the given source is maintained in an electronic fraud network database.

8. An article of manufacture comprising a processor-readable storage medium having processor-readable instructions tangibly embodied thereon which, when implemented, cause a processor to carry out the steps of the method of claim 1.

9. The method of claim 1, wherein said outputting comprises providing visual feedback to the given source in response to a decision by the given source to annotate the item of input data with the fraud-related status identifier.

10. The method of claim 9, wherein said providing visual feedback comprises identifying an instance wherein the fraud-related status identifier is deemed accurate based on a comparison to one or more additional sources.

11. The method of claim 1, wherein said evaluating further comprises comparing the item of input data provided by the given source to one or more established formatting standards associated with input data.

12. The method of claim 11, wherein said one or more established formatting standards associated with input data comprises one or more formatting standards within an electronic fraud network.

13. An apparatus comprising:
a memory; and
at least one processor coupled to the memory; and
one or more modules executing on the at least one processor, wherein the one or more modules comprise:
a module to evaluate an item of input data provided by a given source, wherein the item of input data comprises a fraud-related status identifier attributed by the given source to an item of information, and wherein said evaluating comprises determining a level of accuracy associated with the fraud-related status identifier based on (i) a comparison of the item of input data provided by the given source to one or more items of input data provided by one or more additional sources, and (ii) a trust measure associated with the given source;
a module to output the determined level of accuracy associated with the fraud-related status identifier to the given source; and
a module to update the trust measure associated with the given source based on the determined level of accuracy associated with the fraud-related status identifier provided by the given source.

14. The apparatus of claim 13, further comprising:
a database for storing the trust measure associated with the given source.

15. A method comprising:
analyzing a set of one or more items of input data provided by a given source based on one or more fraud assessment parameters, wherein each of said one or more items of input data comprises a fraud-related status identified by the given source;
computing a fraud probability measure for each of the one or more items of input data based on (i) said analyzing and (ii) a trust measure associated with the given source;
generating an evaluation of the set of one or more items of input data provided by the given source, wherein said evaluation comprises one or more items of information pertaining to a comparison of the computed fraud probability measure for each of the one or more items of input data and the fraud-related status identified by the given source of each of the one or more items of input data; and
updating the trust measure associated with the given source based on the evaluation generated for the set of one or more items of input data provided by the given source;
wherein at least one of said analyzing, said computing, said generating, and said updating is carried out by a computer device.

16. The method of claim 15, further comprising:
repeating said updating step for each additional evaluation associated with each additional set of input data provided by the given source.

17. The method of claim 15, wherein said trust measure associated with the given source is maintained in an electronic fraud network database.

18. The method of claim 15, further comprising:
outputting the evaluation to the given source.

19. The method of claim 18, wherein said outputting comprises providing visual feedback to the given source in response to a decision by the given source to annotate each of the one or more items of input data with the corresponding fraud-related status identifier.

* * * * *